US009098000B2

(12) United States Patent
Hirth et al.

(10) Patent No.: US 9,098,000 B2
(45) Date of Patent: Aug. 4, 2015

(54) PROCESS OF MAKING A THREE-DIMENSIONAL STRUCTURE ON A SUPPORT STRUCTURE

(75) Inventors: Thomas Hirth, Bühl (DE); Achim Weber, Altbach (DE); Kirsten Borchers, Stuttgart (DE); Stefan Güttler, Stuttgart (DE)

(73) Assignee: FRAUNHOFER-GESELLSCHAFT ZUR FORDERUNG DER ANGEWANDTEN FORSCHUNG E.V. (DE)

( * ) Notice: Subject to any disclaimer, the term of this patent is extended or adjusted under 35 U.S.C. 154(b) by 60 days.

(21) Appl. No.: 13/823,820

(22) PCT Filed: Sep. 7, 2011

(86) PCT No.: PCT/EP2011/004508

§ 371 (c)(1), (2), (4) Date: Mar. 15, 2013

(87) PCT Pub. No.: WO2012/034666

PCT Pub. Date: Mar. 22, 2012

(65) Prior Publication Data

US 2013/0171434 A1 Jul. 4, 2013

(30) Foreign Application Priority Data

Sep. 17, 2010 (DE) ......................... 10 2010 045 679

(51) Int. Cl.

| | |
|---|---|
| ***B29C 35/08*** | (2006.01) |
| ***B29C 41/02*** | (2006.01) |
| ***G03G 9/093*** | (2006.01) |
| ***G03G 9/08*** | (2006.01) |
| ***G03G 9/087*** | (2006.01) |
| ***G03G 9/097*** | (2006.01) |
| ***G03G 13/20*** | (2006.01) |
| ***G03G 15/22*** | (2006.01) |

(52) U.S. Cl.

CPC .......... *G03G 9/09364* (2013.01); *G03G 9/0819* (2013.01); *G03G 9/0825* (2013.01); *G03G 9/08708* (2013.01); *G03G 9/08724* (2013.01); *G03G 9/08728* (2013.01); *G03G 9/08753* (2013.01); *G03G 9/08755* (2013.01); *G03G 9/08759* (2013.01); *G03G 9/08771* (2013.01); *G03G 9/08791* (2013.01); *G03G 9/08793* (2013.01); *G03G 9/08795* (2013.01); *G03G 9/09342* (2013.01); *G03G 9/09708* (2013.01); *G03G 9/09725* (2013.01); *G03G 13/20* (2013.01); *G03G 15/224* (2013.01); *Y10T 428/24893* (2015.01)

(58) Field of Classification Search

CPC ........... B29C 67/0074; B29C 67/0077; G03G 9/09342; G03G 9/09357; G03G 9/09364; G03G 9/09371

USPC .......... 264/437, 438, 439, 460, 461, 462, 463

See application file for complete search history.

(56) References Cited

U.S. PATENT DOCUMENTS

| | | | | |
|---|---|---|---|---|
| 4,435,069 | A | 3/1984 | Sato | |
| 5,088,047 | A | 2/1992 | Bynum | |
| 5,212,526 | A | 5/1993 | Domoto et al. | |
| 5,888,689 | A | 3/1999 | De Meutter et al. | |
| 6,066,285 | A | 5/2000 | Kumar | |
| 2002/0145213 | A1* | 10/2002 | Liu et al. | 264/460 X |

FOREIGN PATENT DOCUMENTS

| | | | |
|---|---|---|---|
| DE | 10064563 | A1 | 7/2002 |
| DE | 20 2005 018 237 | U1 | 4/2006 |
| EP | 0 667 381 | B1 | 8/1995 |
| EP | 0 712 050 | A2 | 5/1996 |
| EP | 0 952 498 | A1 | 10/1999 |
| EP | 1 610 186 | A2 | 12/2005 |
| JP | 04177365 | A * | 6/1992 |
| JP | 2000-35689 | | 2/2000 |
| JP | 2004-177660 | | 6/2004 |
| JP | 2005-004142 | | 1/2005 |
| WO | WO 03/075100 | A2 | 9/2003 |
| WO | WO 2006/027264 | A1 | 3/2006 |

OTHER PUBLICATIONS

Xiaohong Wang, et al. "Rapid Prototyping as a Tool for Manufacturing Bioartificial Livers," Trends in Biotechnology, Oct. 18, 2007, vol. 25, No. 11, pp. 505-513.

(Continued)

*Primary Examiner* — Leo B Tentoni

(74) *Attorney, Agent, or Firm* — Ostrolenk Faber LLP

(57) ABSTRACT

The present disclosure relates to polymer particles comprising a polymer matrix having a coating of an inorganic semi-metal oxide or metal oxide, wherein the polymer matrix has at least one first functional group A and at least one second functional group B, both functional groups A and B being able to enter into at least one covalent bond with one another, functional group A being selected from the group consisting of an azide group, C —C double bond, C —C triple bond, aldehyde group, ketone group, imine group, thioketone group and thiol group, and functional group B being selected from the group consisting of a C —C double bond, C —C triple bond, C —N triple bond, diene group, thiol group and amine group.

12 Claims, 2 Drawing Sheets

(56) References Cited

OTHER PUBLICATIONS

English Translation of International Preliminary Report on Patentability dated Mar. 19, 2013 issued in corresponding International Application No. PCT/EP2011/004508 (7 pages).

International Search Report dated Nov. 18, 2011 issued in corresponding International patent application No. PCT/EP2011/004508.

Ejik et al.: "Metal Printing Process: A Rapid Manufacturing Process Based on Xerogrpahy using Metal Powders", Materials Science & Technology, Sep. 25-28, 2005, Pittsburgh, USA.

* cited by examiner

5

10

PROCESS OF MAKING A THREE-DIMENSIONAL STRUCTURE ON A SUPPORT STRUCTURE

CROSS REFERENCE TO RELATED APPLICATIONS

The present application is a 35 U.S.C. §371 National Phase conversion of PCT/EP2011/004508, filed Sep. 7, 2011, which claims benefit of German Application No. 10 2010 045 679.9, filed Sep. 17, 2010, the disclosure of which is incorporated herein by reference. The PCT International Application was published in the German language.

BACKGROUND OF THE INVENTION

1. Technical Field of the Invention

The present invention relates to polymer particles which are especially suitable as toner particles for electrophotographic processes, to electrophotographic processes for production of three-dimensional structures on a support structure, and to the three-dimensional structures produced by means of these processes.

2. Related Art

The manufacture of three-dimensional objects with the aid of computer-generated models is constantly gaining significance. This involves regular buildup layer by layer, which enables individual matching of the desired structure. The demand for components formed from several component parts and the increasingly complex geometry thereof increases the requirements with regard to the spatial resolution of the manufacturing process. Particularly in medical technology, the specific manufacture of transplants is associated with great complexity, since the objects have to be matched individually to each patient.

There are various known processes which enable the buildup of three-dimensional objects from plastic. They are encompassed by the name "Rapid Prototyping" (or "solid freeform fabrication") (Wang, Trends in Biotechnology, 25 (11), pages 505 to 513). However, these processes are either restricted to the application of a single polymer component or have resolutions above >250 μm.

The fusion of toner or polymer particles by means of electromagnetic radiation is known by the name "non-contact fusing". In this process, the electromagnetic radiation is used as a heat source for the fusion of the polymer. Chemical fixing of the toner particles to one another is not achieved (JP 002000035689, JP 002004177660, US 000004435069 A, DE 000010064563 A1).

Electrophotography ("laser printing") has proved in the last few decades to be a reliable method for two-dimensional text printing with comparatively high resolution (1200 dpi, resolution <50 μm). Accordingly, electrophotography constitutes a widespread printing technique with which technical surfaces, usually in the form of paper or film surfaces, can be printed with substances in powder form. In principle, electrophotography involves electrostatic charging, for example with the aid of a preliminary charging roller or a corona, of a rotating photographic roller coated with a photosemiconductor material, followed by exposure at local sites by means of a laser arrangement or an LED array, as a result of which it is at least partly electrically discharged at these exposed regions. All other unexposed regions of the photographic roller remain electrically charged and correspond to the negative image of the two-dimensional structures to be printed, for example in the form of text, images etc. In a subsequent step, pulverulent toner is applied to the exposed photographic roller, the toner being electrostatically charged by friction in the printer and therefore being able to adhere only to the discharged regions of the photographic roller. To influence the electrostatic charging of the toner, modern commercially available toners contain about 2 to 4% by volume of charge control additives. The predominant constituent of the toner, i.e. about 80 to 90% by volume, consists typically of a dry solvent, called the matrix, which typically consists of a mixture of synthetic resin and wax. In a proportion of about 5 to 18% by volume, the toner contains a dye component, for example in the form of carbon black.

There are also known electrophotographic processes with which multilayer objects made from metal powder can be printed (van der Eijk et al., Metal Printing Process: A Rapid Manufacturing Process Based on Xerography using Metal Powders Materials, Science & Technology, 2005). In addition, electrophotographic obtained surfaces have been three-dimensionally structured with the aid of foaming agents (JP 002005004142 AA). However, the resolution cannot be controlled adequately and is restricted to the toner layer present on the support structure. This method therefore does not offer the possibility of generating a three-dimensional object layer by layer.

There are likewise known electrophotographic processes in which the adhesion of the toner on the support structure is increased with the aid of curing reactive groups (U.S. Pat. No. 5,888,689) and/or by post-crosslinking the particles through the addition of photoinitiators (WO 2006/027264 A1, EP 0 667 381 B1, EP 0 952 498 A1). There is also a known process for production of toner materials comprising UV-polymerizable additives (US 000005212526 A). However, these processes achieve solely improved adhesion on the support structure surface and do not ensure the controlled three-dimensional buildup of polymer layers.

However, the use of such processes for biologically and medically usable three-dimensional plastic parts is a problem which has not been solved to date, particularly owing to the need for three-dimensional fixing of the individual particles (U.S. Pat. No. 6,066,285 A).

The technical problem underlying the present invention is to provide processes and means which overcome the aforementioned disadvantages, more particularly processes and means which allow production of high-resolution three-dimensional structures, especially in the μm and/or mm range, especially in a rapidly performable and inexpensive process, and wherein the products produced may also be biocompatible and biofunctional. More particularly, the present invention is based on the technical problem of providing high-resolution three-dimensional structures of the aforementioned type, which can be used, for example, as transplants, in tissue engineering processes or products, as tube structures or the like.

SUMMARY OF THE INVENTION

The present invention solves the underlying technical problem by the provision of polymer particles according to the main claim, and three-dimensional structures produced from these polymer particles, especially by the route of electrophotography, which may be present with or without support structure, with the particular possibility of removal of a portion of the polymer particles, especially at least a portion of at least one polymer particle type, in a controlled manner from the three-dimensional structures produced by means of electrophotography.

More particularly, the invention therefore relates to polymer particles comprising a polymer matrix having a coating of an inorganic semimetal oxide or metal oxide, wherein the polymer matrix has at least one first functional group A and at least one second functional group B, both functional groups A and B being able to enter into at least one covalent bond with one another, said functional group A being selected from the group consisting of an azide group, C—C double bond, C—C triple bond, aldehyde group, ketone group, imine group, thioketone group and thiol group, and said functional group B being selected from the group consisting of a C—C double bond, C—C triple bond, C—N triple bond, diene group, thiol group and amine group.

In the context of the present invention, the functional groups A and B which are able to enter into at least one covalent bond with one another are referred to as mutually complementary groups or pairs of complementary groups. A group complementary to the functional group A is thus the functional group B, and a group complementary to the functional group B is thus the functional group A.

A preferred embodiment thus provides that the functional group A of a polymer particle reacts with the complementary functional group B of another polymer particle, in order thus to achieve fixing of the particles to one another. In the context of the present invention, when the present teaching relates to a covalent bond of two functional groups A and B to one another, this is then understood to mean a covalent bond between a first and a further polymer particle, or a bond between a polymer particle and a support structure having a corresponding complementary group.

The invention therefore advantageously provides polymer particles, which are also referred to as toners or toner particles in the context of the present invention, and which are particularly suitable owing to their particulate and functionalized structure for application to support structures in electrophotographic processes. In a particularly advantageous manner, the functional groups A and B applied on the inventive polymer particles enable fixing of the polymer particles on the support structure surface, and also achievement of fixing of the particles to one another.

The polymer particles which have the functional groups A and B and are accordingly functionalized preferably react with one another according to FIG. 1 of the present teaching in such a way that a functional group A of a first polymer particle reacts with a functional group B of a second polymer particle to form at least one covalent bond, such that the particles are fixed to one another. According to the invention, the presence of the functional groups A and B on the polymer particle of the present invention also enables fixing of the polymer particle on a support structure to be printed, this having a complementary functional group A or B. The reactions between the functional groups A and B therefore lead to an increase in the adhesive force between polymer particle and support structure, and between polymer particle and polymer particle. The inventive polymer particles enable, especially in electrophotographic processes, the buildup of high-resolution three-dimensional structures, especially with resolutions below 250 μm, which may advantageously, owing to the simultaneous applicability of various polymer particles enabled in accordance with the invention, also be formed from various materials which can preferably be transferred selectively to the support structure in one and the same printing cycle, preferably layer by layer, more particularly into one and the same applied layer. In a particularly advantageous manner, the polymer particles of the present invention enable provision of three-dimensional structures fixed by chemical reactions, with the possibility of selective initiation of the chemical reactions required for the fixing in a preferred embodiment. Advantageously, it is possible in this manner to build up three-dimensional objects which can be used, for example, in medical, biomedical or biological products, for example in transplants or as transplants, and can advantageously be produced from biocompatible, especially also biofunctional, polymer particles. The procedure provided in accordance with the invention, which enables transfer of several different polymer materials, i.e. polymer material types, with high resolution in the same printing cycle, also enables the buildup of porous or non-porous structures, for example tube structures which can serve, for example in tissue engineering processes or products, as, for example, biocompatible carrier structures for cell cultures, as transport systems or transport vessels, or as synthetic blood vessels or capillaries.

In a preferred embodiment, the present invention relates to polymer particles, wherein the polymer which forms the polymer matrix is selected from the group consisting of polystyrenes, polystyrene derivatives, polyacrylates, polyacrylic derivatives, polyvinyl acetate, poly(methyl methacrylate), poly(glycidyl acrylate), polyesters, polyamides, polycarbonates, polyacrylonitriles, polyvinyl chlorides, polyethers, polysulfone, polyether ketones, epoxy resin, melamine-formaldehyde resin or derivatives or combinations or copolymers of the polymers mentioned.

In a preferred embodiment, the polymer is a homopolymer, a copolymer, a terpolymer or a mixture (blend) thereof.

The polymeric base material, i.e. the polymer matrix, can be produced in a preferred embodiment by free-radical polymerization, in which an initiator free-radically initiates the polymerization thermally, with induction by radiation, for example having a wavelength of $10^{-14}$ m to $10^{-4}$ m, or owing to a redox process. In addition, in a preferred embodiment, production is possible by means of ionic polymerization, in which either a cationic or anionic initiator initiates the polymerization. In addition, in a preferred embodiment, the synthesis of the material by means of polycondensation is possible, in which case the monomers are polymerized with the stoichiometric elimination of by-products. Moreover, in a preferred embodiment, production by means of polyaddition is possible, in which the polymerization is effected without stoichiometric elimination of by-products. A further means for production, in a preferred embodiment, is that of polyinsertion, in which a metal or metal complex initiates the polymerization. In this way in particular, it is possible to produce homopolymers, copolymers and terpolymers suitable for the process according to the invention. The softening temperature of the material which is caused by a glass transition or a melting transition can, in a preferred embodiment, be influenced by the selection of the repeat unit of the homopolymer or by the respective proportions by mass of the repeat units in the co- or terpolymer or in a mixture (blend) thereof. The softening temperature in a preferred embodiment is from 25° C. to 250° C., preference being given particularly to low-melting materials whose softening temperature is 35° C. to 100° C. The monomers used contain either one or more polymerizable units, such that either linear or crosslinked polymers can form during the polymerization.

In a preferred embodiment, the polymer can be produced by bulk polymerization, in which the polymerization is effected without the presence of a solvent. Likewise in a preferred embodiment, preparation is possible by solution polymerization, in which a solvent which dissolves both the monomer or monomers and the polymer formed is used. In addition, in a preferred embodiment, heterogeneous polymerization methods are possible, in which the polymer becomes insoluble within the dispersant from a particular molecular weight.

In a preferred embodiment, this includes emulsion polymerization, in which the polymerization is effected within micelles which are produced by surfactant molecules or block copolymers. This group likewise includes suspension polymerization, in which the polymerization is effected within dispersed monomer droplets. Furthermore, this group includes dispersion polymerization, in which a dispersant in which the monomer is soluble under the reaction conditions, while the polymer forms an insoluble phase therein from a particular molecular weight, is used.

The polymer particles of the invention are preferably in sphere or droplet form.

In a preferred embodiment of the present invention, the shape of the polymer particles can additionally be altered after the polymerization by thermal or mechanical processing of the polymeric material. These processing steps include melting, extrusion and the grinding of the polymer.

Preferably in accordance with the invention, the polymer particles of the present invention are in powder form.

In a preferred embodiment, the present invention relates to polymer particles of the present invention, wherein the polymer particle has a size of 0.5 to 50 μm, especially 1 to 50 μm, preferably 5 to 50 μm, preferably 5 to 45 μm, preferably 5 to 20 μm, preferably 10 to 45 μm, preferably 15 to 40 μm, especially 20 to 40 μm.

In a preferred embodiment, the present invention relates to polymer particles of the present invention, wherein the polymer particle has at least one additive, the additive in a preferred embodiment of the present invention being selected from the group consisting of a dye, for example carbon black, and a charge control additive.

In a preferred embodiment, the present invention relates to polymer particles having a coating of semimetal oxide or metal oxide of the present invention, wherein the semimetal oxide or metal oxide is an inorganic semimetal oxide or metal oxide, preferably $SiO_2$, $TiO_2$ or $Al_2O_3$. The semimetal oxide or metal oxide serves to control the adhesive force and charge.

In an advantageous configuration of the present invention, the inorganic semimetal oxide or metal oxide which is to be used as a coating and is preferred in accordance with the invention is present on the surface of the polymer matrix in primary particle sizes of 0.1 nm to 300 nm, especially 1 to 100 nm.

In a particularly preferred embodiment of the present invention, the coating of the polymer matrix is not a continuous coating, but a merely partial, localized coating, especially in the form of dots. In a particularly preferred embodiment of the present invention, 5 to 50%, preferably 20 to 50%, preferably 20 to 40%, preferably 30 to 40%, preferably 5 to 20%, preferably 7 to 18%, especially 8 to 16%, of the surface of the polymer particle is covered by the coating.

In a preferred embodiment, the present invention relates to polymer particles of the present invention, wherein the functional groups A and B are able to form a covalent bond with one another by means of a ring closure reaction or ring-free reaction.

In a particularly preferred embodiment, the present invention provides polymer particles which have complementary functional groups A and B, both preferably being members of one of the complementary groups i) to vi) listed below in each case. Accordingly, in a preferred embodiment of the present invention, the polymer particles have pairs of complementary functional groups A and B, preferably those which are each variants in one of the complementary groups i) to vi) defined below.

In a preferred embodiment, the present invention relates to polymer particles of the present invention, wherein the functional group A is selected from the group consisting of azide group, C—C double bond, C—C triple bond, aldehyde group, ketone group, imine group and thioketone group, and the functional group B is selected from the group consisting of C—C double bond, C—C triple bond, C—N triple bond and diene group, and wherein the two are able to form a covalent bond with one another by means of a ring closure reaction and wherein:

i) when the functional group A is an azide group, the functional group B is a C—C double bond, C—C triple bond or C—N triple bond,
ii) when the functional group A is a C—C double bond or C—C triple bond, the functional group B is a C—C double bond or C—C triple bond,
iii) when the functional group A is a C—C double bond or C—C triple bond, the functional group B is a diene group or
iv) when the functional group A is selected from the group consisting of an aldehyde group, ketone group, imine group or thioketone group, the functional group B is a diene group.

In a preferred embodiment, the present invention relates to polymer particles of the present invention, wherein the functional group A is selected from the group consisting of C—C double bond, C—C triple bond and thiol group, and the functional group B is selected from the group consisting of thiol group, amine group, C—C double bond and C—C triple bond, and wherein the two are able to form a covalent bond with one another by means of a ring-free reaction and wherein:

v) when the functional group A is a C—C double bond or C—C triple bond, the functional group B is a thiol or amine group or
vi) when the functional group A is a thiol group, the functional group B is a C—C double bond or C—C triple bond.

The invention also provides a process for producing the inventive polymer particles, by providing particles of the polymer matrix having the functional groups A and B and then providing them with a coating of a semimetal oxide or metal oxide and thus obtaining inventive polymer particles.

The invention also provides a process for producing the inventive polymer particles, wherein particles of the polymer matrix are provided in a first process step, and these are provided with the functional groups A and B in a second process step and provided with a coating of a semimetal oxide or metal oxide in a third process step, and the inventive polymer particles are obtained. In a preferred embodiment, the inventive polymer particles are produced by performing the aforementioned second process step after the third process step, or performing both at the same time.

The invention also provides processes for producing a three-dimensional structure on a support structure, wherein polymer particles according to the present invention and at least one support structure are provided, and wherein the polymer particles are applied to the support structure, especially printing onto it, by means of an electrophotographic process, and a three-dimensional structure with support structure is obtained.

In a preferred embodiment, the electrophotographic process according to the invention is an electrophotographic printing process.

In a preferred embodiment, the present invention relates to a process of the present invention wherein the polymer particles are applied by applying them to the support structure in the form of a layer in a first process step a) and conducting a fixing operation, preferably a selectively initiated fixing operation, in a second process step b). The fixing operation envisaged in accordance with the invention, especially the selectively initiated fixing operation envisaged as preferred, firstly fixes polymer particles having the functional groups A and B on the support structure and secondly fixes the polymer particles to one another.

In a particularly preferred embodiment, process steps a) and b) are performed successively in this sequence at least twice, preferably two to five times, especially two to 14 times, especially two to 30 times, especially three to 30 times, especially four to 20 times, especially five to 15 times, especially five to 10 times, especially 100 to 1000 times, especially 300 to 800 times, especially 400 to 600 times, so as to form a corresponding number of layers.

The process according to the invention is, advantageously and in a preferred embodiment, performable without addition of photoinitiators or UV-polymerizable additives.

In a particularly preferred embodiment, in accordance with the invention, a support structure is coated, especially printed, with polymer particles of the present invention, the support structure having a functional group A or B which is complementary to a functional group A or B of the polymer particle to be applied.

The process according to the invention advantageously enables controlled and especially layer-by-layer buildup of three-dimensional polymer structures by means of electrophotographic processes. Advantageously, due to the functional groups A and B used in accordance with the invention, no addition of photoinitiators, especially UV-labile initiator components, is necessary. In a particularly preferred manner, the fixing is achieved without stoichiometric formation of by-products. In addition, it is advantageous that, in a preferred embodiment of the present invention, the reaction between the functional groups A and B can be selectively initiated, which enables controlled reaction, more particularly fixing, of particular polymer particles with one another. The inventive procedure thus enables the combination and fixing of different polymer particles, i.e. different polymer particle types, in a single layer or several layers, by virtue of the possibility of performing different fixing steps independently, which advantageously enables the selective fixing of different polymer particles. According to the invention, it is unnecessary for the buildup of three-dimensional structures, owing to the specific, mutually matched functional groups used, to undertake a long or energy-intensive heat treatment which, in the prior art, disadvantageously leads to melting of the structures in every fixing step. In the processes known to date, there is accordingly severe deformation of the structures, which limits three-dimensional resolution. In addition, the surface of the object rapidly becomes wavy and more toner is applied to the hills thus formed in further printing passes than in the valleys, which further enhances the wave formation, and the height buildup is ended after only a few layers. Hot rolling or pressing, which are possibly performed, leads to severe structural deformation and an associated reduction in height buildup.

In a particularly preferred embodiment, the functional groups A and/or B which functionalize the polymer particles of the present invention are freely accessible on the particle surface. In a further preferred embodiment, the functional groups A and/or B which functionalize the polymer particles of the present invention are embedded into the polymer matrix below the surface of the polymer particle and may, in a particularly preferred embodiment, be made accessible to a reaction on the particle surface by surface melting or surface sintering.

In a particularly preferred embodiment of the present invention, the polymer particles of the present invention applied to the support structure, preferably in layer form, are surface melted or surface sintered at low temperatures of 30 to 150° C., preferably 60 to 150° C., especially 60 to 120° C., more preferably 70 to 90° C., such that any functional groups on the particle surface which are not as yet directly accessible become accessible to a reaction which brings about fixing on the support structure or to further polymer particle layers applied.

In a particularly preferred embodiment of the present invention, the process according to the invention can be performed by application, heating and fixing of the polymer particles applied, preferably in a manner which repeats a multitude of these process steps.

In a preferred embodiment, the present invention relates to a process of the present invention wherein the sequence of process steps a) and b) with an intermediate process step of surface melting is performed successively at least twice, preferably two to 50 times, especially two to 40 times, especially two to 30 times, especially three to 20 times, especially four to 20 times, especially five to 15 times, especially five to ten times, especially 100 to 1000 times, especially 300 to 800 times, especially 400 to 600 times, such that a corresponding number of layers is obtained.

In a particularly preferred embodiment of the present invention, by means of the electrophotographic process, at least two, preferably several, layers of polymer particles are applied, especially printed on. In a particularly preferred embodiment, each layer is formed from a single polymer particle type. In a preferred embodiment, when more than one layer is present, the layers may each be formed from different polymer particle types. In a further particularly preferred embodiment, at least two different polymer particle types of the present invention are present per layer applied. In a particularly preferred embodiment of the present invention, at least two layers of polymer particles are applied, each individual layer of the at least two layers being formed from different polymer particle types which, in a preferred embodiment, can be selectively and separately initiated and accordingly bonded owing to the different provision with functional groups A and B thereof.

In a particularly preferred embodiment of the present invention, it is possible to form a three-dimensional structure having height differences, i.e. spatial distances in the Z plane, of 0.5 to 15 mm, especially 0.5 to 8 mm, especially 1 to 7 mm, preferably 2 to 6 mm.

In a preferred embodiment, the present invention relates to a process of the present invention wherein the fixing operation is a metal catalyst-mediated, a microwave-initiated, a thermally initiated, a photoinitiated or catalyst-free fixing operation.

The selection of the particular polymer particles of the present invention having functional groups A and B and the corresponding selection of the fixing process can be used to control the fixing and hence the buildup of the three-dimensional structure of the present invention.

In a particularly preferred embodiment, the present invention envisages that the fixing operation which is preferably envisaged in accordance with the invention, especially selectively initiated fixing operation, is effected as a function of the type of functional groups A and B of the polymer particles applied.

In a particularly preferred embodiment, a metal catalyst-mediated, especially copper/zinc-mediated, microwave-initiated or thermally initiated fixing operation is used when the functional groups A and B on the polymer particles used are able to enter into a bond with one another by means of a ring closure reaction, especially when the functional groups A and B are selected from the complementary groups i), iii) or iv).

In a further preferred embodiment, the fixing operation is a photoinitiated, especially UV-initiated, fixing operation, especially when the polymer particles used have functional groups A and B which are able to enter into a bond with one another by means of a ring closure reaction, especially those of complementary group ii).

In a particularly preferred embodiment, the fixing operation used takes place without catalyst, especially when the functional groups A and B are able to enter into a bond with one another in a ring-free reaction, in which case the functional groups A and B of the polymer particle used are those of complementary group v).

In a further preferred embodiment, the fixing operation is a photoinitiated fixing operation, especially at a wavelength of 365 nm, especially when the functional groups A and B used are able to enter into a bond with one another by means of a ring-free reaction, in which case, in a preferred embodiment, the functional groups A and B of the polymer particles used are those of complementary group vi).

In a particularly preferred embodiment, the present invention envisages a process of the present invention wherein i) when the functional group A is an azide group and the functional group B is a C—C double bond, a C—C triple bond or C—N triple bond, the fixing operation, i.e. covalent bonding of the functional groups A and B, is a metal catalyst-mediated, especially copper/zinc-mediated, microwave-initiated or thermally initiated fixing operation. Such a metal-mediated, microwave-initiated or thermally initiated fixing operation can be initiated selectively and enables a particularly controlled buildup of three-dimensionally arranged layers, even of different composition.

In a further preferred embodiment, the invention envisages a process of the present invention wherein ii) when the functional group A is a C—C double bond or C—C triple bond and the functional group B is a C—C double bond or a C—C triple bond, the fixing operation is a photoinitiated, especially UV-initiated, fixing operation. The photoinitiated fixing operation preferred in accordance with the invention enables a particularly controlled buildup of three-dimensionally arranged layers, even of different composition.

In a particularly preferred embodiment, the present invention relates to a process of the present invention wherein iii) when the functional group A is a C—C double bond or C—C triple bond and the functional group B is a diene, the fixing operation is a metal catalyst-mediated, especially copper/zinc-mediated, microwave-initiated or thermally initiated fixing operation. Such a metal-mediated, microwave-initiated or thermally initiated fixing operation can be initiated selectively and enables a particularly controlled buildup of three-dimensionally arranged layers, even of different composition.

In a particularly preferred embodiment, the present invention relates to a process of the present invention wherein iv) when the functional group A is selected from the group consisting of an aldehyde group, ketone group, imine group or thioketone group and the functional group B is a diene group, the fixing operation is a thermally initiated, metal catalyst-mediated, especially copper/zinc catalyst-mediated, or microwave-initiated fixing operation. Such a metal-mediated, microwave-initiated or thermally initiated fixing operation can be initiated selectively and enables a particularly controlled buildup of three-dimensionally arranged layers, even of different composition.

In a further preferred embodiment, the present invention relates to a process of the present invention wherein v) when the functional group A is a C—C double bond or C—C triple bond and the functional group B is a thiol or an amine, the fixing operation is a catalyst-free, i.e. non-selectively initiated, fixing operation.

In a further preferred embodiment, the present invention relates to a process of the present invention wherein vi) when the functional group A is a thiol group and the functional group B is a C—C double or C—C triple bond, the fixing operation is a photoinitiated fixing operation, especially at a wavelength of 365 nm. Such a photoinitiated fixing operation can be initiated selectively and enables a particularly controlled buildup of three-dimensionally arranged layers, even of different composition.

In a preferred embodiment, the process according to the invention envisages a process wherein at least two, preferably two to six, especially three to five, different polymer particle types of the present invention are applied to the support structure, especially in a single layer.

In a preferred embodiment, the present invention relates to a process in which, after the fixing operation in step b), a portion of the polymer particles, especially at least a portion of at least one polymer particle type, is removed in a controlled manner from the three-dimensional structure formed, and this gives, for example, functional three-dimensional hollow structures such as tube structures and/or porous structures.

In a preferred embodiment, the portion of the polymer particles to be removed, especially at least a portion of at least one polymer particle type, is removed, especially degraded, by enzymatic and/or chemical processes.

In a preferred embodiment of the invention, the portion of the polymer particles to be removed, especially at least a portion of at least one polymer particle type, is removed without removing the support structure. In a preferred embodiment of the invention, the portion of the polymer particles to be removed, especially at least a portion of at least one polymer particle type, and the support structure are removed.

Different polymer particle types of the present invention may be those particles which, in the presence of the same functional groups A and B, compared to other polymer particles of the present invention, feature solely a differently constructed polymer matrix. Different polymer particle types of the present invention may, however, also be those polymer particles which, with the same polymer matrix compared to other polymer particles of the present invention, have different functionalization in the form of at least one different functional group A and/or B. Different polymer particle types of the present invention may also be those which are notable both with regard to the polymer material of the matrix and with regard to the functionalizing groups A and/or B.

In a particularly preferred embodiment, the at least two, preferably several or many different polymer particle types of the present invention may be present in a single layer or in at least one layer, preferably several or many layers, of the three-dimensional structure produced.

In a particularly preferred embodiment, in accordance with the invention, a stiff or flexible support structure is used, and the support structure may especially be produced from a polymer material. In a particularly preferred embodiment, the support structure may be a plastic foil, plastic film, membrane, glass, metal, semimetal, fleece or paper, preferably composed of biocompatible, especially biodegradable material.

In a preferred embodiment, the present invention envisages separating the three-dimensional structure produced in accordance with the invention from the support structure, for example by chemical or physical degradation or biodegradation, and thus obtaining a three-dimensional structure without support structure.

There follows a description of an inventive production, especially an inventive printing operation, with reference to components present in a laser printer arrangement known per se. In the case of use of a conventional laser printer, a support structure to be printed with inventive polymer particles, for example glass or a piece of paper, typically in DIN A 4 format, is conveyed by means of a conveyor belt to the photographic roller of a printer and pressed onto the photographic roller by means of rubber or foam rollers arranged below the conveyor belt. The advance speed of the support structure to be printed is synchronized to the rotation speed of the photographic roller, such that the roller with the functionalized polymer particles adhering thereon in structured form rolls without slippage against the support structure to be printed, for example paper, and the functionalized polymer particles are transferred to the paper surface. If the aim is to deposit several different polymer particles onto one and the same support structure, a correspondingly large number of printers with corresponding photographic rollers are arranged in succession along the conveyor belt.

In the subsequent step, the functionalized polymer particles adhering on the support structure surface are slightly surface melted in order to make the functional groups of the polymer particles accessible for a bond. For this purpose, the support structure, i.e. in this case the piece of paper, is heated homogeneously to a defined temperature for a defined time. The support structure is preferably heated in an oven outside the printer, since homogeneous heating of the support structure is firstly possible in a very simple manner in this way, and it is secondly possible to avoid thermal stress on the printer itself. Of course, integrated heating systems are also conceivable, in which case the support structure should preferably be heated without contact, for example by way of applied thermal radiation, for example by means of IR radiators.

If required, in a subsequent treatment step, the polymer particles present on the surface of the support structure can be subjected to a chemical aftertreatment, in which additives, i.e., for example, any charge control additives present, are removed.

Especially the use of a printing apparatus which can be found, for example, in DE 20 2005 018 237 U1 opens up the possibility of multiple print coating of an areal region on a support structure to form multilayer systems, for example three-dimensionally structured functional layers or multilayer coats which consist of a multilayer structure, in which each layer is formed from differently functionalized polymer particles. For this purpose, it is possible to use rigid support structures in order to enable reproducible accuracy of position of the support structure in the printer, which is required for several printing passes onto one and the same support structure.

The present invention also provides three-dimensional structures with or without support structure, produced by one of the processes of the present invention.

The polymer particles used in accordance with the invention, and the reaction products thereof which form the three-dimensional structure and have arisen through fixing, can be identified with the aid of elemental analysis, nuclear magnetic resonance (NMR) spectroscopy, X-rays, photoelectron spectroscopy (XPS) and/or infrared spectroscopy (IR).

In a particularly preferred embodiment, the three-dimensional structure with or without support structure, especially with controlled removal of at least some of the polymer particles, especially of at least one polymer particle type, is preferentially suitable for tissue engineering processes or products.

In a preferred embodiment, the three-dimensional structure with or without support structure is a test system, an implant, a carrier structure or a supply structure for tissue engineering processes and products, for example a synthetic blood vessel, a biocompatible porous, nonporous or tubular, branched or unbranched matrix for tissue culture or a transport system for liquids or gases.

In a preferred embodiment, the three-dimensional structures produced are biocompatible, biodegradable and/or biofunctional. In a particularly preferred embodiment, the structures produced are nonporous or porous. Inventive structures can be used, for example, as test systems for, for example, biological, chemical or pharmaceutical active ingredients or systems, or as a transplant, especially as a blood vessel, capillary or tube system.

In a particularly preferred embodiment, the three-dimensional structure with or without support structure comprises a biocompatible polymer material and/or biofunctional toner particles.

Further advantageous configurations of the invention are evident from the dependent claims.

BRIEF DESCRIPTION OF THE DRAWINGS

The invention is illustrated in detail by the examples which follow and the accompanying figures.

The figures show.

DESCRIPTION OF PREFERRED EMBODIMENTS

Figure 1:
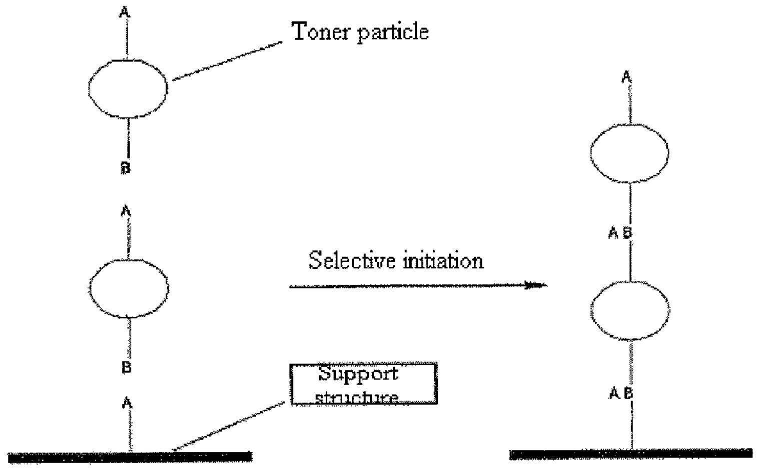
FIG. 1 shows a schematic diagram of the chemical fixing operation according to the present invention by reaction of the functional group A of a first particle with the functional group B of another particle, and of the functional group B of the first particle with the functional group A of the support structure.
Figure 2:
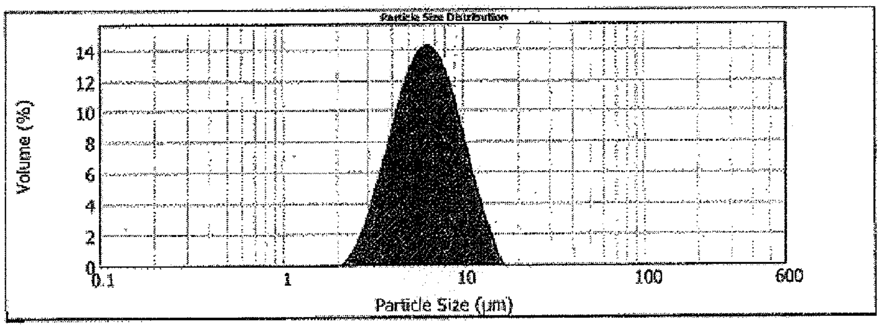
FIG. 2 shows the size distribution of the polymer particles applied in accordance with the invention.
Figure 3:
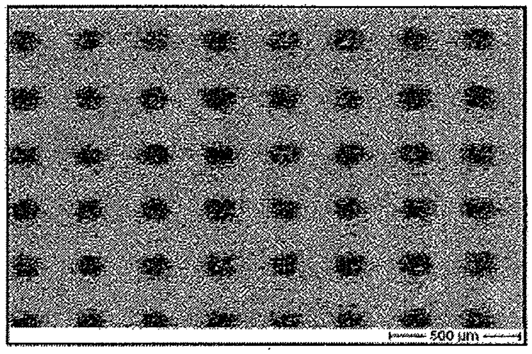
FIG. 3 shows a microscope image of the polymer particles applied after irradiation.
Figure 4:
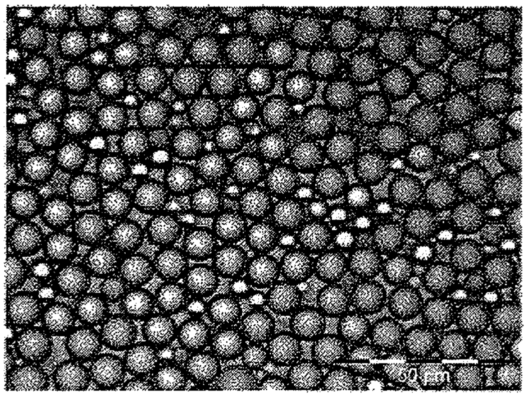
FIG. 4 shows a microscope image of the functionalized polymer particles.

Abbreviations poly(MMA-co-VAc) copolymer of poly(methyl methacrylate) and polyvinyl acetate)

EDCHCl N-(3-dimethylaminopropyl)-N-ethylcarbodiimide hydrochloride q/m charge/mass poly(MMA-co-GMA) copolymer of poly(methyl methacrylate) and poly(glycidyl acrylate)

EXAMPLE 1

2.0 g of poly(MMA-co-VAc) particles were dispersed in 50 ml of $H_2O$, and then 5 ml of glacial acetic acid were added. The suspension was stirred for 1 h to hydrolyze the surface of the polymer particles. Thereafter, the particles were filtered off and washed three times each with 20 ml of phosphate buffer (pH=7) and with 20 ml of $H_2O$. Thereafter, the particles were dried under reduced pressure for 4 h. The surface-activated particles were dispersed in 90 ml of n-hexane, and a solution of 3.39 ml (3.13 g) of dimethylallylsilyl chloride in 10 ml of n-hexane was added dropwise.

The particles were filtered off and washed three times with 20 ml of n-hexane, and dried under reduced pressure for 2 h. The particles were redispersed in 50 ml of $H_2O$, and 4.45 g of EDCHCl were added. Subsequently, 1.79 g of cysteamine were added and the suspension was stirred at RT (room temperature) for 24 h. Thereafter, the particles were filtered off, washed five times with 20 ml each time of $H_2O$ and dried under reduced pressure for 12 h. The q/m ratio of the polymer particles was adjusted with 25 mg of TX-20 silica to a value of −10 μC/g to −30 μC/g, in order subsequently to print the particles with an OKI C7000 printer. The support structure used was a glass plate (20×20 cm) which had been treated beforehand with dimethylallylsilyl chloride at RT for 2 h. After the printing process, the particles were irradiated with a mercury vapor lamp (9 kW) for 15 min in order to fix them on the support structure. Thereafter, a further layer of the toner particles was applied to the first toner layer and irradiation was again effected for 15 min. In this way, a multilayer polymer structure was build up.

EXAMPLE 2 a) 3.0 g of poly(MMA-co-GMA) particles were dispersed in 75 ml of toluene and the suspension was cooled to 0° C. Subsequently, a solution of 1.68 g of propargylamine in 5 ml of toluene was added dropwise over the course of 20 min. After the suspension had been stirred for 1 h, a solution of 8.87 g of (11-azidoundecyl)chlorodimethylsilane in 25 ml of n-hexane was added and the reaction mixture was warmed to RT. After 4 h, the particles were filtered off and washed five times with 50 ml each time of n-hexane. Thereafter, the particles were dried under reduced pressure for 2 h and then redispersed in 200 ml of a 1% copper(I) salicylate solution for 5 min. Then the polymer particles were filtered off and dried unwashed under reduced pressure for 6 h. Subsequently, the q/m ratio was adjusted with 40 mg of TX-20 silica to a value of −10 μC/g to −30 μC/g, and the particles were printed with an OKI C7000 printer. The support structure used was a glass plate (20×20 cm) which had been treated beforehand with (11-azidoundecyl)chlorodimethylsilane at RT for 2 h. After the printing process, the particles were irradiated with microwave radiation (1100 W) for 2 min in order to fix them on the support structure. Thereafter, a further layer of the toner particles was applied to the first toner layer, and irradiation was again effected for 2 min. In this way, a multilayer polymer structure was built up.

b) 3.0 g of poly(MMA-co-GMA) particles were dispersed in 75 ml of toluene and the suspension was cooled to 0° C. Subsequently, a solution of 1.68 g of propargylamine in 5 ml of toluene was added dropwise over the course of 20 min. After the suspension had been stirred for 1 h, a solution of 8.87 g of (11-azidoundecyl)chlorodimethylsilane in 25 ml of n-hexane was added and the reaction mixture was warmed to RT. After 4 h, the particles were filtered off and washed five times with 50 ml each time of n-hexane. Thereafter, the particles were dried under reduced pressure for 6 h. Subsequently, the q/m ratio was adjusted with 36 mg of TX-20 silica to a value of −10 μC/g to −30 μC/g, and the particles were printed with an OKI C7000 printer. The support structure used was a glass plate (20×20 cm) which had been treated beforehand with (11-azidoundecyl)chlorodimethylsilane at RT for 2 h. After the printing process, the particles were irradiated with microwave radiation (1100 W) for 30 min in order to fix them on the support structure. Thereafter, a further layer of the toner particles was applied to the first toner layer, and irradiation was again effected for 30 min. In this way, a multilayer polymer structure was built up.

What is claimed is:

1. A process for producing a three-dimensional structure on a support structure, wherein polymer particles are applied to a support structure by an electrophotographic process, said polymer particles comprising a polymer matrix having a coating of an inorganic semimetal oxide or metal oxide, wherein the polymer matrix has at least one first functional group A and at least one second functional group B, both functional groups A and B being able to enter into at least one covalent bond with one another, said functional group A being selected from the group consisting of an azide group, C—C double bond, C—C triple bond, aldehyde group, ketone group, imine group, thioketone group and thiol group, and said functional group B being selected from the group consisting of a C—C double bond, C—C triple bond, C—N triple bond, diene group, thiol group and amine group, and wherein the functional groups A and B conduct a ring closure reaction with one another, and wherein, i) when the functional group A is an azide group, the functional group B is a C—C double bond, C—C triple bond or C—N triple bond, ii) when the functional group A is a C—C double bond or C—C triple bond, the functional group B is a C—C double bond or C—C triple bond, iii) when the functional group A is a C—C double bond or C—C triple bond, the functional group B is a diene group or iv) when the functional group A is selected from the group consisting of an aldehyde group, ketone group, imine group and thioketone group, the functional group B is a diene group, such that a three-dimensional structure with support structure is obtained.

2. The process according to claim 1, wherein the polymer particles are applied by applying them to the support structure in the form of a first layer in a first process step a) and conducting a fixing operation in a second process step b).

3. The process according to claim 1, wherein process steps a) and b) are conducted at least twice in succession.

4. The process according to claim 2, wherein the fixing operation is a metal catalyst-mediated, a microwave-initiated, a thermally initiated, a photoinitiated or catalyst-free fixing operation.

5. The process according to claim 1, wherein at least two different polymer particle types are applied to the support structure, said polymer particles comprising a polymer matrix having a coating of an inorganic semimetal oxide or metal oxide, wherein the polymer matrix has at least one first functional group A and at least one second functional group B, both functional groups A and B being able to enter into at least one covalent bond with one another, said functional group A being selected from the group consisting of an azide group, C—C double bond, C—C triple bond, aldehyde group, ketone group, imine group, thioketone group and thiol group, and said functional group B being selected from the group consisting of a C—C double bond, C—C triple bond, C—N triple bond, diene group, thiol group and amine group.

6. The process according to claim 1, wherein the polymer which forms the polymer matrix is selected from the group consisting of polystyrene, polyvinyl acetate, poly(methyl methacrylate), poly(glycidyl acrylate), polyester, polyether, polysulfone, polyether ketone, epoxy resin, and copolymers thereof.

7. The process according to claim 1, wherein the semimetal oxide or metal oxide is $SiO_2$, $TiO_2$ or $Al_2O_3$.

8. The process according to claim 1, wherein the functional groups A and B are able to enter into at least one covalent bond with one another by a ring closure reaction or ring-free reaction.

9. The process according to claim 1, wherein the functional groups A and B are able to conduct a ring-free reaction with one another and wherein:

v) when the functional group A is a thiol group, the functional group B is a C—C double bond or C—C triple bond or vi) when the functional group A is a C—C double bond or C—C triple bond, the functional group B is a thiol or amine group.

10. The process according to claim 1, wherein the polymer particle has a size of 0.5 to 50 μm.

11. The process according to claim 1, wherein the polymer particle has a further additive selected from the group consisting of a dye and a charge control additive.

12. The process according to claim 1, wherein the polymer particles having at least one functional group A and at least one functional group B are provided with a coating of an inorganic metal oxide or semimetal oxide.

* * * * *